United States Patent
Zömbik et al.

(10) Patent No.: US 9,351,272 B2
(45) Date of Patent: May 24, 2016

(54) PROTECTING LOCATION INFORMATION

(75) Inventors: Lászlo Zömbik, Zalaegerszeg (HU); Attila Báder, Paty (HU); József Barta, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/404,796

(22) PCT Filed: Jun. 1, 2012

(86) PCT No.: PCT/EP2012/060372
§ 371 (c)(1),
(2), (4) Date: Dec. 23, 2014

(87) PCT Pub. No.: WO2013/178284
PCT Pub. Date: Dec. 5, 2013

(65) Prior Publication Data
US 2015/0173036 A1 Jun. 18, 2015

(51) Int. Cl.
*H04W 24/00* (2009.01)
*H04W 64/00* (2009.01)
*H04W 12/02* (2009.01)
*H04M 3/22* (2006.01)
*H04M 3/42* (2006.01)

(52) U.S. Cl.
CPC ............ *H04W 64/00* (2013.01); *H04W 12/02* (2013.01); *H04M 3/2227* (2013.01); *H04M 3/42348* (2013.01); *H04M 2203/6009* (2013.01)

(58) Field of Classification Search
CPC ... H04W 64/00; H04W 12/02; H04M 3/2227; H04M 3/4234; H04M 2203/60098
USPC ............. 455/456.1, 456.3, 435.1, 435.2, 424, 455/419
See application file for complete search history.

(56) References Cited

U.S. PATENT DOCUMENTS

| 6,195,557 B1 * | 2/2001 | Havinis ................. H04W 64/00 455/433 |
| 2004/0259574 A1 | 12/2004 | Daniels et al. |
| 2014/0321648 A1 * | 10/2014 | Kim ................... G06Q 20/3278 380/270 |

OTHER PUBLICATIONS

3GPP, "3rd Generation Partnership Project; Technical Specification Group Services and System Aspects; Security aspects of Machine-Type Communications; (Release 11)", 3GPP TR 33.868 V0.7.0, Feb. 2012, 1-50.
Ardagna, Claudio A. et al., "An Obfuscation-Based Approach for Protecting Location Privacy", IEEE Transactions on Dependable and Secure Computing, vol. 8, No. 1, Jan.-Feb. 2011, 13-27.

(Continued)

*Primary Examiner* — Khai M Nguyen
(74) *Attorney, Agent, or Firm* — Murphy, Bilak & Homiller, PLLC

(57) ABSTRACT

This disclosure provides a method, a Back-end-server (102, 400, 506) and a system (500) for protection of location information of a UE. The Back-end-server can receive (104, 202, 302) a request message from an operator interface (504) requesting location information of the UE. Based on probability criteria or blocking factors, it is determined (110, 208, 306-310) whether location information may be transferred to the operator interface. One advantage is that a quantitative security for the privacy of subscribers is provided, with which the privacy of the subscribers is not disclosed.

19 Claims, 4 Drawing Sheets

(56) References Cited

OTHER PUBLICATIONS

Bamba, Bhuvan et al., "PrivacyGrid: Supporting Anonymous Location Queries in Mobile Environments", Retrieved from the Internet: URL:http://smartech.gatech.edu/handle/1853/20111 [retrieved on Sep. 3, 2008], 2007, 1-16.

Chow, Chi-Yan et al., "A Privacy-Preserving Location Monitoring System for Wireless Sensor Networks", IEEE Transactions on Mobile Computing, vol. 10, No. 1, Jan. 2011, 94-107.

Hossain, Al-Amin et al., "H-Star: Hilbert-order based Star Network Expansion Cloaking Algorithm in Road Networks", The 14th IEEE International Conference on Computational Science and Engineering, Aug. 24, 2011, 81-88.

Unknown, Author, "Considerations about user consent in case of area or management based MDT activation", 3GPP TSG SA Meeting #51, SP-110187, Nokia Siemens Networks, Kansas City, USA, Mar. 21-23, 2011, 1-2.

Unknown, Author, "Reply LS on MDT user involvement (S5-110367 / R2-110699)", 3GPP TSG-SA5 (Telecom Management), SA5#75, S5-110482, revision of S5-110376, Sorrento, Italy, Jan. 24-28, 2011, 1-4.

\* cited by examiner

PROTECTING LOCATION INFORMATION

TECHNICAL FIELD

This disclosure pertains in general to the field of network management, and more particularly to a method, a Back-end-server and a system for determining whether location information of a user equipment may be transferred from the Back-end-server to a Front-end-server.

BACKGROUND

In a radio access network of mobile telecommunication networks such as global system for mobile communications, wide-band code division multiple access or long-term evolution, monitoring of the radio environment measurements are of importance in order to ensure good network coverage, service quality and high transmission capacity.

For radio environment monitoring, standard radio measurements that are specified by third generation partnership project can be used. The radio measurements are performed by the user equipments and the base stations. This means that no additional probes or measurement equipments, or drive tests are necessary for the radio measurements.

Network management systems are typically used to schedule and activate the radio environment measurements. The measured data is provided to the network management system or to a performance monitoring (PM) system.

In addition to the radio measurements, the user equipments (UEs) and the base stations also report information that can be used for localization, for example timing information of received radio frames, or directly positioning system coordinates of the UEs.

A number of localization technologies are implemented in network management system in order to determine the position of the UEs within the cell.

The localization information, similarly to radio environment statistics (RES) data from the radio environment measurements, is also collected by the base stations and sent to the network management system or the PM system. The localization information may be sent together with or separated from the RES data.

In the management system the localization information is correlated with radio environment measurements and/or other performance measurement data.

The accuracy of the positioning methods can be in the order of 10-100 m. Therefore, in an advanced network management system detailed information is basically available for UEs of each subscriber, actual and past position, user behaviour, etc.

Some of the performance monitoring data includes identities of the UE or the subscribers and localization data of each UE. This may be a problem since this data is therefore available and can be processed by e.g. radio network optimization engineers, who are not authorized to identify individual subscribers and determine their position. Radio network optimization engineers need to localize only RES data and PM data to improve network performance.

Even if the UE or subscriber data are not included explicitly in the PM data, radio network optimization engineers can query PM information in educated ways, and may learn some facts which do not belong to their duty and which could be used to violate subscriber privacy.

PM analysis often requires historical data. The subscriber behaviour and the subscriber itself, based on the behaviour, can be identified based on historical data. For instance, staying at regular positions or travelling in regular routes, the subscriber and his/her UE can be identified, even if the international mobile subscriber identity (IMSI)/international mobile equipment identity (IMEI) are coded.

There is a potential threat, where a rogue user e.g. a rogue radio network optimization engineers of the network management system could destroy the mobile operator's credibility by extracting and disclosing the subscribers' privacy, while collecting and evaluating radio performance data.

Some security techniques limit the access to performance monitoring data to radio network optimization engineers of the network management system, which make radio optimization more difficult. Other security techniques are limited to providing distinguished access rights to different radio network optimization engineers.

SUMMARY

In view of the above, it is a general object of embodiments of the invention to provide protection of location information of a UE.

According to one aspect of this disclosure a method for determining whether location information of a UE may be transferred to a Front-end-server, is disclosed. The method is performed by a Back-end-server and comprises receiving a request message from the Front-end-server, the request message requesting location information of the UE within a selected area of the request, i.e. the area the request relates to; obtaining location information of the UE; obtaining one or more blocking factors related to the location information of the UE; obtaining one or more probability criteria for locating the UE; and determining whether location information of said UE is to be transferred to the Front-end-server dependent on whether one or more of the blocking factors related to the location information of the UE are activated or one or more of the probability criteria for locating the UE are fulfilled. In this way sensitive subscriber data is protected and access to PM data are allowed only when subscriber privacy is ensured.

The location information may comprise geographical position coordinates or topological position of the UE, e.g. cell information, which is one example of sensitive data.

At least one of the probability criteria may be determined by comparing a predetermined probability threshold value with a randomly generated probability value or with a calculated probability value based on the request message. In this way the method provides a quantitative confidence level of the data, which can be used for ensuring the security of the PM system and estimate a number of potential security risks.

The method may further comprise obtaining information about the number of UEs in the selected area of the request, and the blocking factor of the method may be activated at any of following cases:
a) if the number of UEs in the selected area of the request does not exceed a predefined number;
b) if the selected area of the request does not exceed a predefined size;
c) if the density of the UEs in the selected area of the request does not exceed a predefined value;
d) if the frequency of the request message of the Front-end-server exceeds a predefined value;
e) if the frequency of the request message of any Front-end-server exceeds a predefined value;
f) if the difference between the location information of the UE and the location information of the same UE related to a previous request message is less than a predefined value. These checks take into account important security aspects.

Determining whether location information is to be transferred, may comprise blocking transferring of said location information of said UE to the Front-end-server if one or more of the blocking factors related to the location information of said UE are activated or at least one probability criterion is not fulfilled.

Determining whether location information is to be transferred, may comprise transferring said location information of said UE to the Front-end-server if no blocking factors related to the location information of said UE are activated and all probability criteria that are checked are fulfilled.

The UEs in the selected area of the request have an identifier or the subscribers of the UEs have an identifier, wherein said identifiers of the UEs and/or the identifiers of the subscribers of the UEs may be partially or completely scrambled, the method further comprising transferring a partially or completely scrambled identifier of said UE or the identifier of the subscriber of said UE, to the Front-end-server. In this way a radio network optimization engineer may obtain the performance monitoring and location of the measurements but he cannot connect these data to subscribers. In the case of partial scrambling, it may be possible to identify which measurement data are measured by the same UE, but it is not possible to identify which UE.

The identifiers of UE s may comprise the international mobile equipment identifier (IMEI) of each UE and wherein the identifiers of the subscriber of the UEs may comprise the international mobile subscriber identifier (IMSI) of each UE.

The request message and the location information may comprise a time stamp indicating the time at which said request message was received by the Front-end-server and the time at which each piece of location information was created, respectively.

In determining whether location information of said UE is to be transferred to the Front-end-server, one or more of the probability criteria for locating the UE may be fulfilled if $1/u$ is lower than a probability threshold, where u is the number of UEs in the selected area of the request.

In determining whether location information of said UE is to be transferred to the Front-end-server, one or more of the probability criteria for locating said UE may be fulfilled if $k/u$ is lower than a probability threshold, where u is the number of UEs in the selected area of the request, and k is the number of UEs for which location information is requested.

The probability value may depend on previous request messages of the Front-end-server initiated in a predefined period or depend on previous request messages of the Front-end-server initiated previously together with a request message of at least one additional Front-end-server for a predefined period.

According to a second aspect of the present disclosure, a Back-end-server for determining whether location information of a user equipment, UE, may be transferred to a Front-end-server including an operator interface, is disclosed. The back-end-server is a performance server, whereas the front-end-server is a presentation server. The Back-end-server comprises a processor, and a memory storing computer program comprising computer program code. When the computer program code is run in the processor, as a response to a receipt of a request message from a Front-end-server, the request message requesting location information, causes the Back-end-server to obtain location information of said UE, obtain one or more blocking factors related to the location information of said UE within a selected area of the request, obtain one or more probability criteria locating said UE, and determine whether location information of said UE is to be transferred to the Front-end-server in dependence of whether one or more of the blocking factors related to the location information of the UE are activated or one or more of the probability criteria for locating said UE are fulfilled.

The request message requesting location information, causing the Back-end-server to determine whether location information is to be transferred, may further comprise to cause the Back-end-server to block the transfer of said location information of said UE to the Front-end-server if one or more of the blocking factors related to the location information of said UE are activated or at least one probability criterion is not fulfilled.

The request message requesting location information, causing the Back-end-server to determine whether location information is to be transferred, may further comprise to cause the Back-end-server to transfer said location information of said UE to said Front-end-server if no blocking factors related to the location information of said UE are activated and no probability criteria are not fulfilled.

According to a third aspect of the present disclosure, a system for determining whether location information may be transferred is disclosed. The system comprises a Back-end-server that is configured to communicate with the Front-end-server comprising an operator interface. The Back-end-server comprises a processor, and a memory storing computer program comprising computer program code which, when run in the processor, as a response to a receipt of a request message from a Front-end-server wherein the request message is requesting location information, causes the serve to: obtain location information of said UE; and obtain one or more blocking factors related to the location information of said UE within a selected area of the request. The request message further causes the Back-end-server to obtain one or more probability criteria locating said UE; and to determine whether location information of said UE is to be transferred to the Front-end-server in dependence of whether one or more of the blocking factors related to the location information of the UE are activated or one or more of the probability criteria for locating said UE are fulfilled.

The operator interface of said Front-end-server in said system may be configured to receive said location information from the Back-end-server.

The system being a telecommunication management system, wherein the Back-end-server may comprise business logic of the telecommunication management system and wherein the operator interface of said Front-end-server may act as an access and presentation interface to the telecommunication management system.

Embodiments of the present disclosure come with one or more the following advantages:

One advantage of the present invention is that sensitive subscriber data (IMSI, IMEI) and the information required for the radio network optimization process (location and radio measurement data) are decoupled.

By the above decoupling within the disclosure, emerging operator security requirements on data confidentiality and user privacy can be fulfilled.

The solution may provide a fine-grained authorization, with which the mobile operator's security administrator can set the anonymity level of the subscribers, is provided.

The disclosure can quantify the level of security of the subscriber and its positioning data for the network management application.

The security architecture enables the network operators to efficiently use the performance data for network optimization and protect the subscriber data in the same time.

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which FIG. 1 briefly illustrates a signalling scheme related to embodiments of the present disclosure.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like numbers refer to like elements throughout the description.

Protection of location information of the UEs of the subscribers is carried out by providing quantitative security for the most likely attacks on the privacy of the subscribers of the UEs. The quantitative security is realized by transferring location information of the UE to a Front-end-server having an operator interface, with a probability that is below a predetermined probability threshold unless the transfer is either blocked by activated blocking factors or hindered by one or more probability criteria that are not fulfilled.

Figure 1:
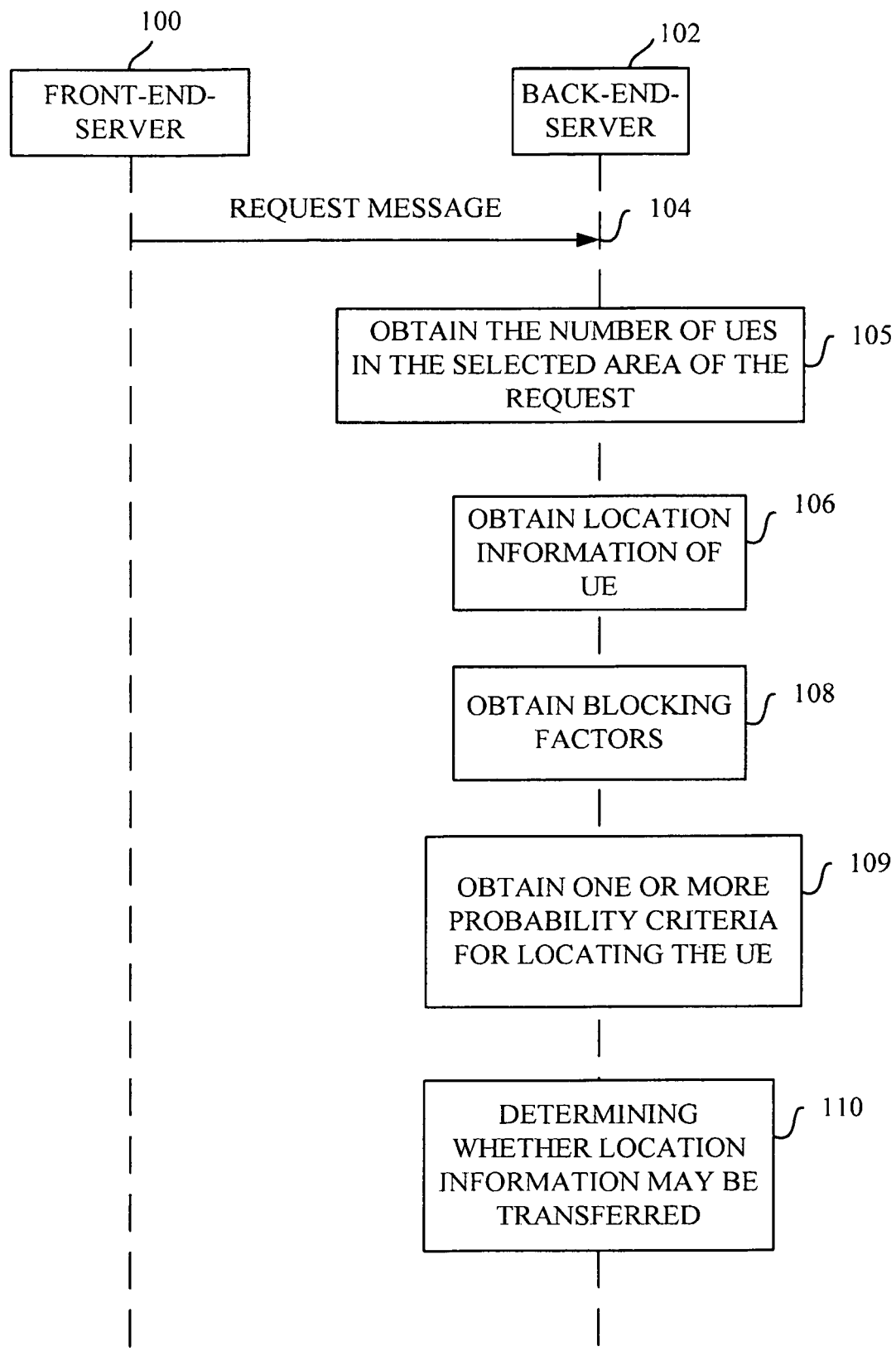

FIG. 1 presents a simplified signalling scheme of signalling between a Front-end-server 100 and a Back-end-server 102. The Front-end-server 100 sends 104 a request message to the Back-end-server 102. The request message comprises a request of location information of a UE within a selected area of the request. Information about the selected area of the request is comprised within the request message. The Back-end-server 102 obtains 105 the number of UEs in the selected area of the request. The Back-end-server obtains 106 location information of the UE. The Back-end-server also obtains 108 one or more blocking factors. In addition the Back-end-server obtains 109 one or more probability criteria for locating the UE. The Back-end-server then determines 110 whether location information may be transferred to the Front-end-server 100.

Figure 2:
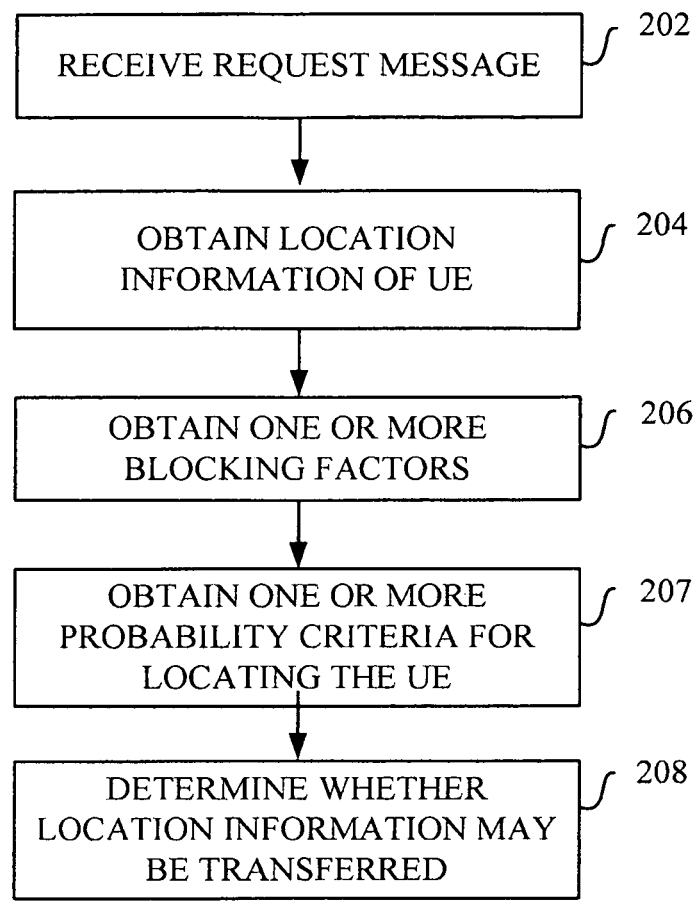
FIG. 2 illustrates a flowchart of a method according to embodiments of the present disclosure.

FIG. 2 presents a flow chart of a method for determining whether location information may be transferred to a Front-end-server, the method being performed in a Back-end-server, according to embodiments of the present disclosure. In 202 the Back-end-server receives a request message from the Front-end-server, the request message requesting location information of the UE within a selected area of the request. In 204 the Back-end-server obtains location information of the UE. In 206 the Back-end-server obtains one or more blocking factors. In 207 the Back-end-server obtains one or more probability criteria for locating the UE. In 208 the Back-end-server determines whether location information is to be transferred to the Front-end-server dependent on whether one or more of the blocking factors related to the location information of the UE are activated or one or more of the probability criteria for locating the UE are fulfilled.

The request message comprises information about the selected area of the request.

It is mentioned that some blocking factors relate to the frequency with which location information of the UE is requested or the frequency with which an operator interface requests location information. Location information may comprise a time indicator indicating at what time the location information was created. The request message may also comprise a time indicator indicating the time at which the request message was received at the server.

Location information of the UE may comprise geographical position coordinates of the UE.

The received request messages may also be stored in a database together with a time indicator indicating at what time the request message was received at the server. If for instance the time between two consecutive requests, is too short, a corresponding blocking factor is activated, and location information is hence not transferred to the Front-end-server.

The database containing the request messages, received earlier, may increase in time, as the requestors perform more and more queries. After a certain period of time, which can be configured, the database entries can be purged to limit the size of the database and to improve performance. Note, however, in this case the expected (preconfigured) probabilities may not be guaranteed by a system herein.

Identity information of the UE or that of the subscriber of the UE may be transferred to the Front-end-server, in addition to the location information of the UE.

In general it is appreciated that if a Network Operator (NO) has reasons to be careful about the privacy of the subscribers, no information about the identity of the subscribers or their UE is provided to the Front-end-server besides the provided location information. As mentioned above a prerequisite for transfer of location information is that no blocking factors are activated and that all probability criteria that are checked are fulfilled.

If a NO allows tracking of a UE, identity information of the UE or of the subscriber of the UE must not be transferred to the Front-end-server. This is of importance since the privacy of the subscriber else would clearly be disclosed. In this case the NO would have had to set fairly liberal time-related blocking factors in order not to activate any such time-related blocking factor.

The identifiers of the UEs within the selected area of the request may comprise the international mobile equipment identifier, IMEI, of the UEs. The identifiers of the subscriber of the UEs may comprise the international mobile subscriber identifier, IMSI, of the UEs.

In order to increase the privacy of the subscribers, scrambling of the identity of the subscriber or the subscriber's UE may be performed before providing identification information together with location information to the Front-end-server. Scrambling may be performed by randomizing the identity of the subscribers or the identity of the subscriber's UE. Transfer may then be performed by transferring the partially or completely scrambled identifiers of said one or more UEs or the identifier of the subscriber of said one or more UEs, to the Front-end-server.

Partial scrambling of IMSI may be achieved by scrambling all numbers in the IMSI, except for the numbers describing the country code and network ID in the IMSI. Partial scrambling may also be achieved by scrambling all numbers in IMSI, if the IMSI does not belong to the network provider; when the country code and the network ID does not match to the country code and the network ID of the network provider. An example of partial scrambling of the IMEI is scrambling all numbers in the IMEI, except for the vendor or UE types.

Alternatively, NO may provide identity information of a UE by randomly selecting the identity of the UE or of the subscriber of the UE among UEs located within the selected area of the request according to the request message.

In order to further explain the present disclosure, a few application examples are now presented.

Consider an optimization engineer who via an operator interface is attempting to measure radio access network parameters in a selected area of the request, comprising two cells, one of which covers a highway and the other covers a high-density area.

On the high-way, a number of subscribers travel at a relatively high speed along predetermined directions.

Triggered for instance by a complaint from a subscriber somewhere within the selected area of the request, measurements of signal strengths of UEs located in the selected area of the request are per formed in an attempt to correct a low user experience. A request message requesting location information of UEs the selected area of the request is sent to the Back-end-server. The Back-end-server then determines whether location information of the UEs may be transferred to the Front-end-server. Location information of the UEs reveals that a low signal-to-noise ratio is detected for UEs on the highway, whereas a comparatively strong signal-to-noise ratio is measured for UEs in the high-density cell. In this case, identity indicators may be needed or may not be needed by the Front-end-server. If identity indicators are needed, these may be provided to the Front-end-together with, or separated from, location information. Identity indicators may be provided since the location information of the UE may be merely a snap shot of the location at the time at which the location information was created. For instance, after a short period of time, the position of a UE among the UEs is very likely to have changed, for which reason the privacy of the subscriber of said UE is thus not disclosed. If on the other hand repeated location requests are received for a UE travelling along the high-way, a blocking factor is likely to be activated since a determined average speed along a high-way of known direction provides a good estimate of a future geographical location of the UE with some certainty. In this case, the privacy is at risk to be disclosed. A corresponding blocking factor is thus activated hindering disclosing of the privacy of subscribers of UEs within the selected area of the request.

In another service, a NO may offer the functionality to track a UE during a time period. Herein location information is repeatedly provided at times with relatively short time periods in between. In this case, neither the identity of the UE nor the one of the subscriber of the UE can be provided to the Front-end-server, since this would disclose the privacy of said subscriber. As mentioned above, location patterns may also be identified for which reason any identity of the UE must not be provided to the Front-end-server.

It has thus been presented a few of options of how embodiments of the present disclosure may be applied. For each case, it is determined whether location information of a UE may be transferred or not, and this may be dependent on a few factors.

An operator interface may also have to be authenticated and authorized, in order to determine whether said operator interface is authorized to request location information or not. In authentication, an identity of the operator interface is provided to the server. The Back-end-server then determines whether this operator interface with said provided identity is authorized to perform a request. If for instance the operator interface is not recognized by the Back-end-server as the claimed identity, it is not authorized to request location information of any UE. Furthermore, the operator interface may be recognised by the Back-end-server as the claimed identity, but the operator interface has no rights to request or receive the location information, then the operator interface is not authorized. If the operator interface is not authorized to request or receive location information, the request will be rejected and any transfer of location information blocked, without further control.

Herein below, blocking factors that may be activated are at first presented. Then, examples of probability criteria that have to be fulfilled in order to transfer location information of the UE are presented.

Blocking factors are provided to enable hindering or blocking of the transfer of location information. This is performed by activating one or more of said blocking factors.

The message requesting location information may refer to one or more UEs within the selected area of the request, which UEs are a subset of all UEs within said selected area. Location information of one or more UEs may thus be requested, where the one or more are out of a total number of UEs in the selected area of the request. Requesting location information of a UE within a selected area of the request, may hence comprise requesting location information of one or more UEs within a selected area of the request.

Some examples of blocking factors are:

Minimal UE population of the selected area of the request; u_min. If the number of UEs in the selected area of the request is below the minimal UE population, a blocking factor is activated. The selected area of the request thus has to contain at least the minimal population of UEs in order not to activate the blocking factor.

Minimal area of the request to be selected; A_min. The selected area of the request within the request message must not be smaller than A_min. For example a cell, a set of cells or the area of the request may be quantified in a number of square meters.

Minimal UE density of the selected area of the request; ro_min. If the selected area of the request has a UE density that is less than the minimal UE density of the selected area of the request, the request is not granted and returns in a failure. This may be used, when the Back-end-server receives a request from an operator interface wishing to request location information of a UE within a poorly populated selected area of the request. The density of the UEs in the selected area of the request has to reach a minimal UE density in order not to activate a blocking factor.

Minimal time between request messages; t_min. At least minimal time duration has to lapse after a receipt of a first request message from an operator interface, until a second request message from the same operator interface can be accepted as a valid request, in order not to activate a blocking factor.

Minimal time between requests for all operator interfaces; t_min_global. An operator interface is obligated to wait this minimal time after the latest of all other requests already made, before a new request can be accepted as a request not to activate the corresponding blocking factor. Similarly, if the request message is received by the Back-end-server from one and the same operator interface with a frequency that is higher than a predefined value, a blocking factor is activated. Also, if request messages are received by the Back-end-server from the same or different operator interfaces with a frequency that is higher than a predefined value, a blocking factor is activated:

Threshold time of static user; t_static. If a UE of the subscriber is found to be located in the same place at a time t, as the same UE was located in at a time t−t_static, then the subscriber of the UE is behaving as a static subscriber, for which reason a request towards the UE of said subscriber is failed due to an activated blocking factor.

Defined measurement error; DME. If the location information of a UE was determined with a higher measurement error than the defined measurement error, a corresponding blocking factor is activated.

A number of additional blocking factors are envisaged herein, all of which relate to the selected area of the request, the number of UEs related in the selected area of the request and the time of which the request and/or the location information of a UE was created.

Now, the Back-end-server also determines whether location information may be transferred to the Front-end-server dependent on whether one or more probability criteria are fulfilled or not.

Herein below a few probability criteria will be presented.

Maximum level of probability of the UE, of which location information is requested, is identified by an operator interface; threshold P2. This threshold is thus set and compared with a probability value p2 that can either be calculated based on information from the request message, or be randomly generated. The calculated value is based on the number of UEs, u, located in the selected area of the request. By randomly picking one UE out of a number of u UEs, the chance to pick a specific UE is 1/u. The calculated value of the probability value is thus 1/u. The estimated value is a randomly generated probability between 0 and 1. The probability criterion is fulfilled if the probability value p2 is lower than the probability threshold P2. In the case the request message comprises requesting location information k number of UEs; it is determined whether a calculated value of k/u is lower than the probability threshold P2. The probability criterion is fulfilled if the probability value k/u is lower than the probability threshold P2.

Maximum level of probability_of the UE to be located in a successive request by a specific operator interface, threshold P1. It is determined whether the UE has earlier been requested by this operator interface. This may be performed by checking in a history database whether the operator interface has indeed requested location information of that UE. If it is detected that the UE is requested in a successive request area of the request by said specific operator interface, a probability value p1 is randomly generated between 0 and 1 and compared to threshold P1. If the randomly generated probability value p1, is below threshold P1, the probability criterion is fulfilled.

Similarly, a maximum level of probability of the UE to be identified in a successive request by one or more operator interfaces; threshold P3. It is thus determined whether the UE has earlier been requested by one or more operator interfaces. This may be performed by checking in a history database whether one or more operator interfaces have indeed requested location information of that UE. If it is detected that the UE is requested in a successive request by one or more operator interfaces, a probability value p3 is randomly generated between 0 and 1 and compared to threshold P3. If the randomly generated probability value p3, is below threshold P3, this probability criterion is fulfilled.

A probability, P4, that the UE is static, based on the previous measurements is determined. If a UE was located in the same place more frequently in the measurement history than this P4 probability, then the subscriber of the UE is identified as static subscriber.

Determining whether location information is to be transferred, may thus comprise blocking the transfer of said location information of said UE to the Front-end-server 100, 502 if one or more of the blocking factors related to the location information of said UE are activated or at least one probability criterion is not fulfilled.

Determining whether location information is to be transferred, may thus comprise transferring said location information of said UE to the Front-end-server 100, 502 if no blocking factors related to the location information of said UE are activated and no probability criteria are not fulfilled.

Figure 3:
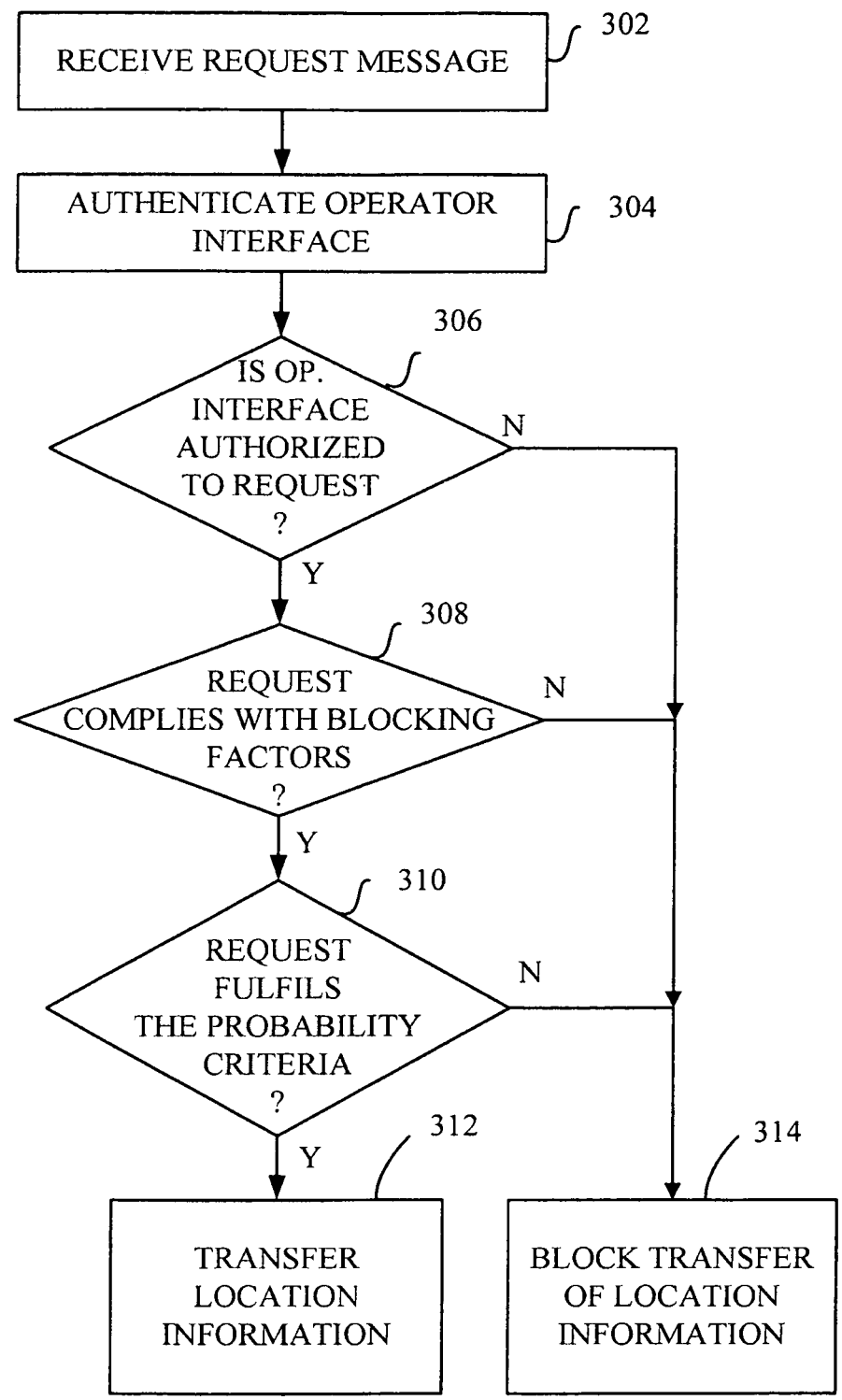
FIG. 3 illustrates a flowchart of a method according to an embodiment of the present disclosure.

FIG. 3 presents a flow chart of a method for determining whether location information may be transferred to an operator interface of a Front-end-server. In 302 a Back-end-server receives a request message from a Front-end-server. In 304 the Back-end-server authenticates the operator interface of the Front-end-server. Based on this authentication, the Back-end-server determines 306 whether the operator interface is authorized to request location information. If the Front-end-server is authorized to request in 306 the Back-end-server determines 308 whether the request complies with blocking factors. If the request complies with the blocking factors in 308, the Back-end-server 310 determines whether the request fulfils probability criteria. If the request fulfils the probability criteria, the Back-end-server transfers location information of the UE to the operator interface of the Front-end-server.

If it is determined that the operator interface is indeed not authorized to request, in 306, the transfer of location information is blocked. Also, if it is determined that the request does not comply with the blocking factors or if it is determined that the request does not fulfil one or more probability criteria, the transfer of location information is blocked 314.

If the operator interface is authorized to request, the request complies with all available blocking factors, and the request fulfils the probability criteria, location information is indeed transferred 312 to the operator interface.

Figure 4:
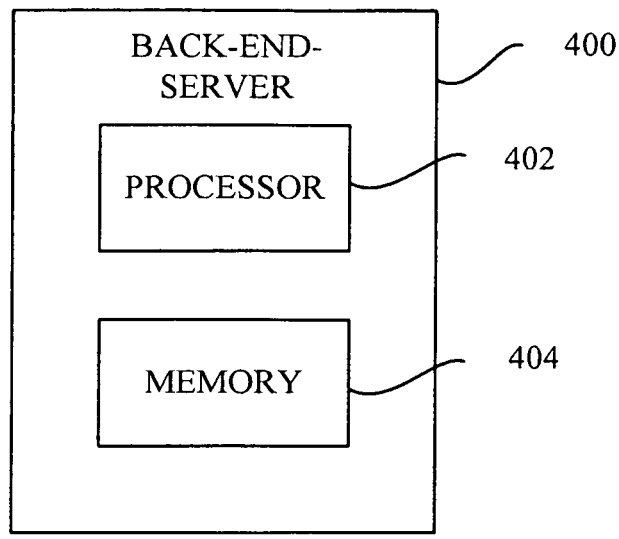
FIGS. 4 and 5 schematically illustrate arrangements according to embodiments of the present disclosure.

FIG. 4 schematically presents a Back-end-server 400 for determining whether location information of a UE may be transferred to a Front-end-server. The Back-end-server comprises a processor 402 and a memory 404, where the memory stores computer program comprising computer program code which when run on the processor, as a response to receipt of a request message requesting location information of the UE causes the Back-end-server to: obtain location information of said UE; obtain one or more blocking factors related to the location information of said UE within a selected area of the request; obtain one or more probability criteria locating said UE; and determine whether location information of said UE is to be transferred to the Front-end-server in dependence of whether one or more of the blocking factors related to the location information of the UE are activated or one or more of the probability criteria for locating said UE are fulfilled.

The message requesting location information causing the Back-end-server to determine whether location information is to be transferred, may further comprise to cause the Back-end-server to block a transfer of said location information of said UE to the Front-end-server 100, 502 if one or more of the blocking factors related to the location information of said UE are activated or at least one probability criterion is not fulfilled.

The message requesting location information causing the Back-end-server to determine whether location information is to be transferred, may further comprise to cause the Back-end-server to transfer said location information of said UE to said Front-end-server 100, 502 if no blocking factors related to the location information of said UE are activated and no probability criteria are not fulfilled.

Figure 5:
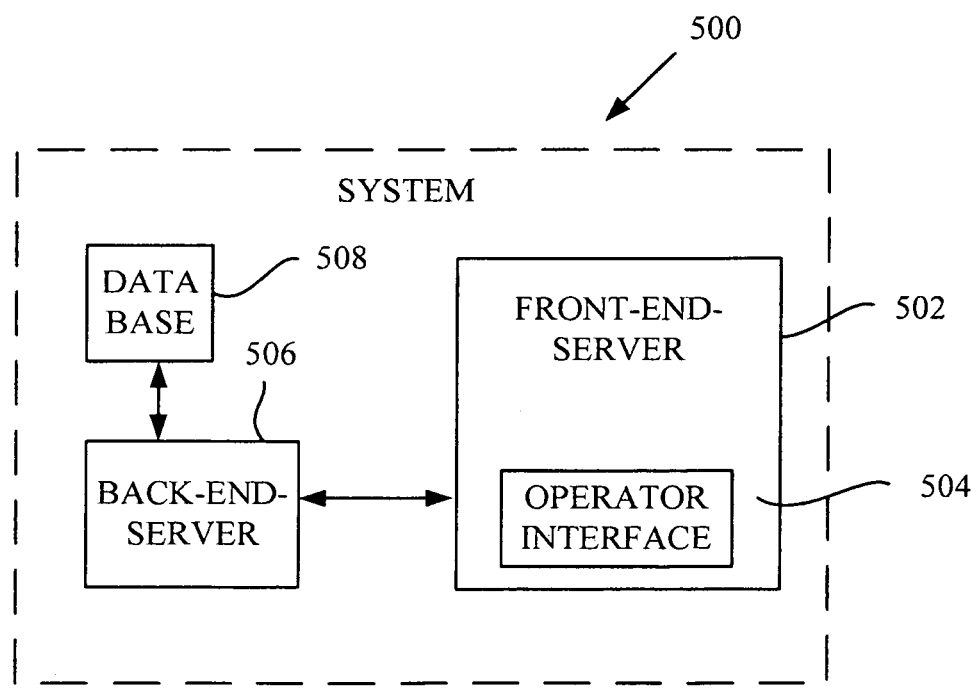

FIG. 5 schematically presents a system 500 for determining whether location information may be transferred to a Front-end-server 502. The system comprises a Back-end-server 102, 400, 506 that is configured to communicate with the Front-end-server 100, 502 comprising an operator interface 504. The Back-end-server 102, 400, 506 comprises a processor 402, and a memory 404 storing computer program comprising computer program code which, when run in the processor, as a response to a receipt of a request message from a Front-end-server 100, 502, wherein the request message is requesting location information, causes the Back-end-server 102, 400, 506 to: obtain location information of said UE; and obtain one or more blocking factors related to the location information of said UE within a selected area of the request. The request message further causes the Back-end-server to obtain one or more probability criteria locating said UE; and to determine whether location information of said UE is to be transferred to the Front-end-server 100, 500 in dependence of whether one or more of the blocking factors related to the location information of the UE are activated or one or more of the probability criteria for locating said UE are fulfilled.

The system may further comprise a database 508 comprising request message history data, location history data, and/or user data.

The operator interface 504 of said Front-end-server of the system may further be configured to receive said location information from the server.

The system is typically a telecommunication management system, and the Back-end-server 506 therein may comprise business logic of the telecommunication management system and wherein the operator interface 504 of said Front-end-server 502 may further act as an access and presentation interface to the telecommunication management system.

Embodiments of the present disclosure come with one or more the following advantages:

One advantage of the present invention is that sensitive subscriber data, such as IMSI and IMEI, and the information required for radio network optimization, i.e. location data and radio measurement data, are decoupled. This is performed by determining whether the privacy of a subscriber of a UE is disclosed by providing location information of the UE to an operator interface. Similarly, IMSI and IMEI data may not be provided to the operator interface if the subscriber's privacy is at risk.

By the above decoupling within the disclosure, emerging operator requirements on data confidentiality and subscriber privacy can be fulfilled.

The solution may provide a fine-grained authorization, with which the mobile operator's security administrator can set the anonymity level of the subscribers, is provided.

The disclosure can quantify the level of security of the subscriber and its positioning data for the network management application.

The security architecture enables the network operators to efficiently use the performance data for network optimization and protect the subscriber data in the same time.

It should be emphasized that this disclosure may be varied in many ways.

The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units, interfaces and processors.

Moreover, even though the embodiments of this disclosure are primarily described in the form of methods and network nodes, they may at least partly be embodied in a computer program product, as well as in a system comprising a computer processor and a memory coupled to the computer processor, wherein the memory is encoded with one or more computer programs for performing at least a part of the methods described herein.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to (a) specific embodiment(s), it is not intended to be limited to the specific form set forth herein. Rather, this disclosure is limited only by the accompanying claims and, other embodiments than the specific above are equally possible within the scope of these appended claims.

The invention claimed is:

1. A method for determining whether location information of a user equipment (UE) with an identifier in a communication network may be transferred to a Front-end-server, the method being performed by a Back-end-server and comprising:
 receiving a request message from the Front-end-server, the request message requesting location information of the UE within a selected area of the request;
 obtaining location information of the UE;
 obtaining one or more blocking factors related to the location information of the UE;
 obtaining one or more probability criteria for locating the UE; and
 determining whether the location information of said UE is to be transferred to the Front-end-server in dependence on at least one of:
  whether one or more of the blocking factors related to the location information of the UE are activated; and
  whether the probability criteria for locating the UE are fulfilled.

2. The method according to claim 1, wherein the location information of the UE comprises at least one of:
 geographical position coordinates of the UE; and
 a topological position of the UE.

3. The method according to claim 1, wherein at least one of the probability criteria is determined by comparing a predetermined probability threshold value with a probability value that is randomly generated or is calculated based on the request message.

4. The method according to claim 3, wherein the probability value depends on previous request messages of the Front-end-server initiated in a predefined period.

5. The method according to claim 3, wherein the probability value depends on previous request messages of the Front-end-server initiated previously together with a request message of at least one additional Front-end-server for a predefined period.

6. The method according to claim 1, further comprising obtaining information about the number of UEs in the selected area of the request, and wherein one or more of the blocking factors is activated at any of following cases:
   a) when the number of UEs in the selected area of the request does not exceed a predefined number;
   b) when the selected area of the request does not exceed a predefined size;
   c) when the density of the UEs in the selected area of the request does not exceed a predefined value;
   d) when the frequency of the request message of the Front-end-server exceeds a predefined value;
   e) when the frequency of the request message of any Front-end-server exceeds a predefined value;
   f) when the difference between the location information of the UE and the location information of the same UE related to a previous request message is less than a predefined value.

7. The method according to claim 6, wherein the UEs in the selected area of the request, or the subscribers of the UEs in the selected area of the request, each has an identifier, the method further comprising partially or fully scrambling said identifiers, and transferring the partially or completely scrambled identifiers to the Front-end-server.

8. The method according to claim 7, wherein the identifiers of UEs comprise the international mobile equipment identifiers (IMEIs) of the UEs and wherein the identifiers of the subscribers comprise the international mobile subscriber identifiers (IMSIs) of the UEs.

9. The method according to claim 1, wherein determining whether the location information is to be transferred, comprises blocking transferring of said location information of said UE to the Front-end-server responsive to at least one of: determining that one or more of the blocking factors related to the location information of said UE are activated; and determining that at least one probability criterion among the probability criteria is not fulfilled.

10. The method according to claim 1, wherein determining whether the location information is to be transferred, comprises transferring said location information of said UE to the Front-end-server responsive to determining that none of the blocking factors are activated and that the probability criteria are fulfilled.

11. The method according to claim 1, wherein the request message and the location information comprises a time stamp indicating the time at which said request message was received by the Front-end-server and the time at which location information of the UE was created, respectively.

12. The method according to claim 1, wherein, in determining whether the location information of said UE is to be transferred to the Front-end-server, one or more of the probability criteria for locating the UE are fulfilled when l/u is lower than a probability threshold, where u is the number of UEs in the selected area of the request.

13. The method according to claim 1, wherein, in determining whether location information of said UE is to be transferred to the Front-end-server, one or more of the probability criteria for locating said UE are fulfilled if k/u is lower than a probability threshold, where u is the number of UE in the selected area of the request, and k is the number of UEs for which location information is requested.

14. A Back-end-server for determining whether location information of a user equipment (UE) may be transferred to a Front-end-server including an operator interface, the Back-end-server comprising:
a processor, and
a memory storing computer program comprising computer program code which, when run in the processor, as a response to a receipt of a request message from the Front-end-server, wherein the request message is requesting location information, causes the Back-end-server to:
obtain location information of said UE;
obtain one or more blocking factors related to the location information of said UE within a selected area of the request;
obtain one or more probability criteria for locating said UE; and
determine whether location information of said UE is to be transferred to the Front-end-server in dependence on at least one of:
   determining whether one or more of the blocking factors related to the location information of the UE are activated; and
   determining whether the probability criteria for locating said UE are fulfilled.

15. The Back-end-server according to claim 14, wherein, in determining whether said location information of said UE is to be transferred, the Back-end-server is caused to block a transfer of said location information to the Front-end-server, responsive to determining at least one of:
   that one or more of the blocking factors related to the location information of said UE are activated,
   that at least one probability criterion among the one or more probability criteria is not fulfilled.

16. The Back-end-server according to claim 14, wherein in determining whether said location information of said UE is to be transferred, the Back-end-server is caused to transfer said location information to said Front-end-server responsive to determining that no blocking factors related to the location information of said UE are activated and that the probability criteria are fulfilled.

17. A system for determining whether location information of a user equipment (UE) may be transferred to a Front-end-server in a communication network, the system comprising:
a Back-end-server configured to communicate with the Front-end-server comprising an operator interface, wherein the Back-end-server comprises:
a processor, and
a memory storing computer program comprising computer program code which, when run in the processor, as a response to a receipt of a request message from the Front-end-server, wherein the request message is requesting location information, causes the Back-end-server to:
obtain location information of said UE;
obtain one or more blocking factors related to the location information of said UE within a selected area of the request;
obtain one or more probability criteria for locating said UE; and
determine whether the location information of said UE is to be transferred to the Front-end-server in dependence on at least one of:
   determining whether one or more of the blocking factors related to the location information of the UE are activated; and
   determining whether the probability criteria for locating said UE are fulfilled.

18. The system according to claim 17, wherein the operator interface of said Front-end-server is configured to receive said location information from the Back-end-server.

19. The system according to claim 17, wherein the system is a telecommunication management system, wherein the Back-end-server comprises a business logic of the telecommunication management system and wherein the operator interface of said Front-end-server acts as an access and presentation interface to the telecommunication management system.

* * * * *